Patented Jan. 2, 1945

2,366,492

UNITED STATES PATENT OFFICE 2,366,492

HEAT STABILIZATION

Fred W. Cox, Cuyahoga Falls, Ohio, assignor to Wingfoot Corporation, Akron, Ohio, a corporation of Delaware No Drawing. Application December 29, 1942, Serial No. 470,483

5 Claims. (Cl. 260—73)

This invention relates to the stabilization of polyvinyl acetal compositions. The acetals may, for example, be obtained by treating polyvinyl alcohol with an aldehyde. Generally, only partial conversion to the acetal is effected. For instance, commercial polyvinyl butyral resin contains about 20 per cent of hydroxy and about 2 per cent acetate groups, the balance being polyvinyl butyral. Although the invention applies to other acetals, such as polyvinyl acetal and polyvinyl propional, it will be described more particularly in connection with the stabilization of polyvinyl butyral resin because this is the most common commercially.

The stabilizer of this invention is cyanamide or dicyandiamide. Either one of these compounds when present in a small amount prevents or inhibits decomposition of a polyvinyl acetal resin when subjected to heat. In the absence of any stabilizer, the polyvinyl acetal resins decompose at elevated temperatures and discolor. The presence of one of the stabilizers of this invention prevents or retards such discoloration.

The stabilizer will usually be used in an amount equal to at least about 0.5 per cent of the polyvinyl acetal resin, and as much as 10 per cent or more may be employed. The stabilizer may be incorporated in the resin in any suitable manner. The use of the stabilizer is illustrated in the following examples:

Example 1

Two cements—one containing 1 part of polyvinyl butyral resin in 4.6 parts by weight of alcohol and the other containing 1 part of polyvinyl butyral and 0.02 part of cyanamide in 4.6 parts by weight of alcohol—were poured into glass molds, and the alcohol was allowed to evaporate. The resulting films were placed in an oven at 110° C. At the end of twenty-four hours the film containing the cyanamide was much less discolored than that to which nothing had been added.

Example 2

Two cements—one containing 1 part of polyvinyl butyral resin in 4.6 parts by weight of alcohol and the other containing 1 part of polyvinyl butyral resin and 0.02 part of dicyandiamide in 4.6 parts by weight of alcohol—were poured into glass molds, and the alcohol was allowed to evaporate. The resulting films were placed in an oven at 110° C. At the end of three hours the film containing no stabilizer was yellow, and that containing the stabilizer was almost colorless. At the end of twenty-four hours the stabilized film was much less disclosed than the control.

What I claim is:

1. A composition of a polyvinyl acetal formed from polyvinyl alcohol and an aliphatic aldehyde which contains a stabilizer for the acetal from the group consisting of cyanamide and dicyandiamide.

2. Polyvinyl butyral resin containing cyanamide as a stabilizer.

3. Polyvinyl butyral resin containing dicyandiamide as a stabilizer.

4. A substantially colorless film composed largely of polyvinyl butyral resin stabilized with cyanamide.

5. A substantially colorless film composed largely of polyvinyl butyral resin stabilized with dicyandiamide.

FRED W. COX.